(12) United States Patent
Durkin

(10) Patent No.: US 10,787,204 B2
(45) Date of Patent: *Sep. 29, 2020

(54) THERMAL TRANSMISSION STRUCTURE FOR CREATING HEAT GENERATED GRAPHICS ON EXTERNAL VEHICLE PANELS

(71) Applicant: Ford Global Technologies, LLC, Dearborn, MI (US)

(72) Inventor: Jedidiah Paul Durkin, Detroit, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 168 days.

This patent is subject to a terminal disclaimer.

(21) Appl. No.: 15/850,070

(22) Filed: Dec. 21, 2017

(65) Prior Publication Data
US 2018/0111442 A1    Apr. 26, 2018

Related U.S. Application Data

(63) Continuation of application No. 14/734,533, filed on Jun. 9, 2015, now Pat. No. 9,889,718.

(51) Int. Cl.
*B62D 25/12* (2006.01)
*B44C 1/00* (2006.01)
(Continued)

(52) U.S. Cl.
CPC .............. *B62D 25/12* (2013.01); *B44C 1/00* (2013.01); *H05B 1/0236* (2013.01); *B60R 13/00* (2013.01); *G09F 21/048* (2013.01)

(58) Field of Classification Search
CPC .... B60H 1/00271; B44C 1/00; H05B 1/0236; B62D 25/12; B60R 13/00; B60R 13/005; G09F 21/048
(Continued)

(56) References Cited

U.S. PATENT DOCUMENTS 3,654,062 A   4/1972 Loew
4,920,759 A   5/1990 Tanaka et al.
(Continued)

FOREIGN PATENT DOCUMENTS

CN   201129655   * 12/2007
CN   103101519 A   5/2013
(Continued)

OTHER PUBLICATIONS

Ebay, http://www.ebay.com/gds/How-do-I-know-what-options-my-mirror-has-/10000000006202887/g.html, Mar. 16, 2008, 2 pages.

*Primary Examiner* — Qingzhang Zhou
(74) *Attorney, Agent, or Firm* — David Coppiellie; Price Heneveld LLP

(57) ABSTRACT

A vehicle includes a body panel coupled to a vehicle frame and having an outer surface and an inner surface, a thermal structure disposed proximate the inner surface of the body panel, wherein the thermal structure includes at least one of a heat-emitting portion and a heat-absorbing portion, wherein the thermal structure is in communication with the outer surface of the body panel to define an ambient temperature portion and a differential temperature portion, and wherein the differential portion is in communication with the thermal structure and cooperates with the thermal structure to generate a predetermined pattern. A controller having at least one of a humidity sensor and a temperature sensor is in communication with the outer surface of the body panel, wherein the controller operates the thermal structure according to data delivered to the controller from at least one of the humidity and temperature sensors.

7 Claims, 7 Drawing Sheets

(51) Int. Cl.
*H05B 1/02* (2006.01)
*B60R 13/00* (2006.01)
*G09F 21/04* (2006.01)

(58) Field of Classification Search
USPC .......................................... 180/69.2; 165/41
See application file for complete search history.

(56) References Cited

U.S. PATENT DOCUMENTS

| | | |
|---|---|---|
| 5,029,662 A | 7/1991 | Pena |
| 5,031,712 A | 7/1991 | Karolek et al. |
| 5,115,116 A | 5/1992 | Reed |
| 5,316,513 A * | 5/1994 | Nakagawa ............... A63H 3/36 428/31 |
| 5,386,098 A | 1/1995 | Knudsen |
| 5,624,591 A | 4/1997 | Di Trapani |
| 5,897,802 A | 4/1999 | Jones |
| 6,450,277 B1 | 9/2002 | Kargilis et al. |
| 6,475,559 B1 | 11/2002 | Bettinger |
| 6,575,258 B1 | 6/2003 | Clemmer |
| 6,762,396 B2 | 7/2004 | Abbott et al. |
| 6,963,049 B1 | 11/2005 | Martin et al. |
| 6,964,294 B2 | 11/2005 | Hendricks et al. |
| 6,966,962 B2 | 11/2005 | Spain et al. |
| 7,783,400 B1 | 8/2010 | Zimler |
| 8,927,106 B2 | 1/2015 | Ho et al. |
| 9,499,209 B1 | 11/2016 | Frank et al. |
| 2002/0011946 A1 | 1/2002 | Artis et al. |
| 2004/0021575 A1 | 2/2004 | Oskorep |
| 2007/0261816 A1 | 11/2007 | Warren et al. |
| 2013/0155709 A1* | 6/2013 | Kim .................... B60Q 3/30 362/496 |
| 2015/0337745 A1 | 11/2015 | MacNeille et al. |
| 2016/0278166 A1 | 9/2016 | Seong et al. |

FOREIGN PATENT DOCUMENTS

| | | |
|---|---|---|
| CN | 203567688 U | 4/2014 |
| DE | 102012013445 A1 | 1/2014 |

* cited by examiner

US 10,787,204 B2

THERMAL TRANSMISSION STRUCTURE FOR CREATING HEAT GENERATED GRAPHICS ON EXTERNAL VEHICLE PANELS

CROSS-REFERENCE TO RELATED APPLICATION

The present application is a continuation of U.S. patent application Ser. No. 14/734,533 filed Jun. 9, 2015, entitled THERMAL TRANSMISSION STRUCTURE FOR CREATING HEAT GENERATED GRAPHICS ON EXTERNAL VEHICLE PANELS, the entire disclosure of which is hereby incorporated herein by reference.

FIELD OF THE INVENTION

The present invention generally relates to exterior body panels for vehicles, and more specifically, a heat transmission structure for forming heat generated graphics through the use of moisture and precipitation in and around the vehicle.

BACKGROUND OF THE INVENTION

Various automobiles include one more indicia on the exterior of the vehicle for conveying various information about the make, model, or other characteristic of the particular vehicle. Certain indicia can be painted, etched, or otherwise formed within the shape of the exterior body panels.

SUMMARY OF THE INVENTION

According to one aspect of the present invention, a vehicle includes a body panel coupled to a vehicle frame and having an outer surface and an inner surface. A thermal structure is disposed proximate the inner surface of the body panel, wherein the thermal structure includes at least one of a heat-emitting portion and a heat-absorbing portion. The thermal structure is in communication with the outer surface of the body panel to define an ambient temperature portion and a differential temperature portion. The differential temperature portion is in communication with the thermal structure and cooperates with the thermal structure to generate a predetermined pattern on the outer surface. A controller having at least one of a humidity sensor and a temperature sensor is in communication with the outer surface of the body panel, wherein the controller operates the thermal structure according to sensed data delivered to the controller from at least one of the humidity and temperature sensors.

According to another aspect of the present invention, a vehicle includes a body panel and a thermal structure disposed proximate an inner surface of the body panel. The thermal structure is shaped according to a predetermined indicia. A controller is included for regulating an emitted temperature generated by the thermal structure. The emitted temperature is delivered to the body panel for creating a temperature differential proximate an outer surface of the body panel substantially in a shape corresponding to the predetermined indicia.

According to another aspect of the present invention, a temperature-controlled vehicle body includes a thermal structure having a heat-emitting portion. A body panel having an outer surface is in communication with the heat-emitting portion, wherein the heat-emitting portion emits heat in a predetermined pattern. The heat generates a temperature differential on the outer surface of the body panel. The temperature differential defines ambient and differential portions of the outer surface of the differential portion corresponding to the predetermined pattern.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
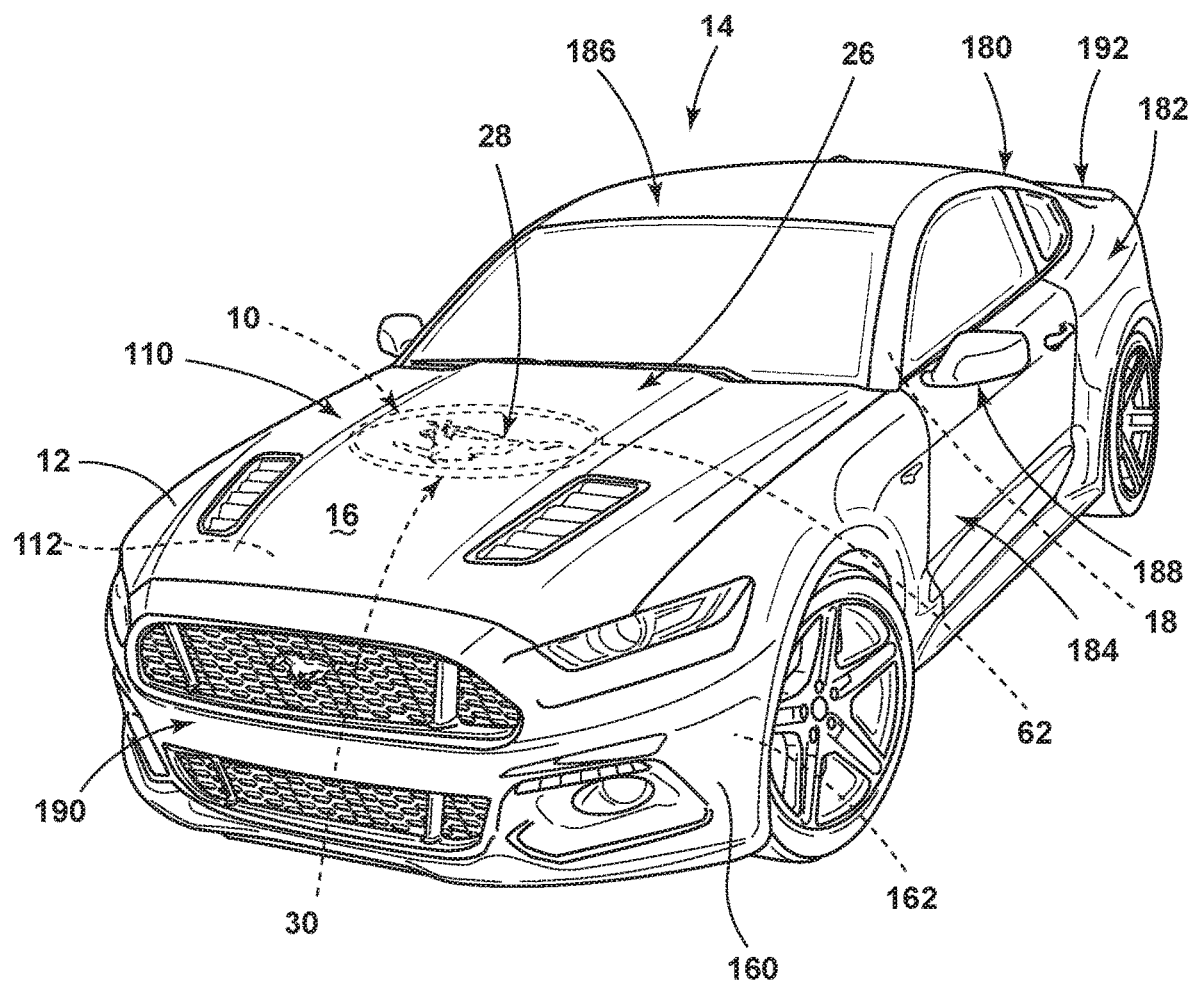
FIG. 1 is a top front perspective view of a vehicle incorporating the thermal structure proximate a body panel of the vehicle.
Figure 2:
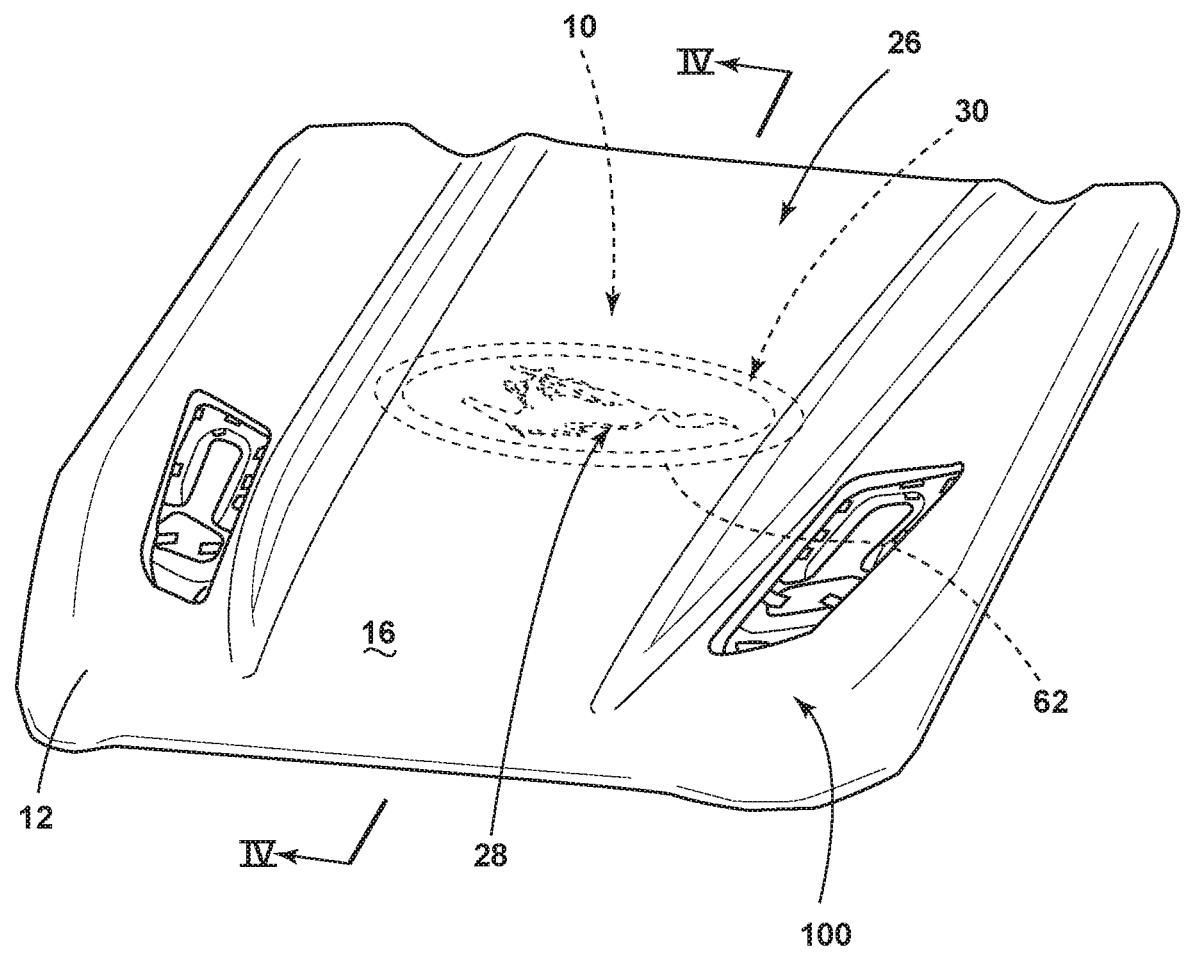
FIG. 2 is a top perspective view of a body panel for the vehicle of FIG. 1.
Figure 3:
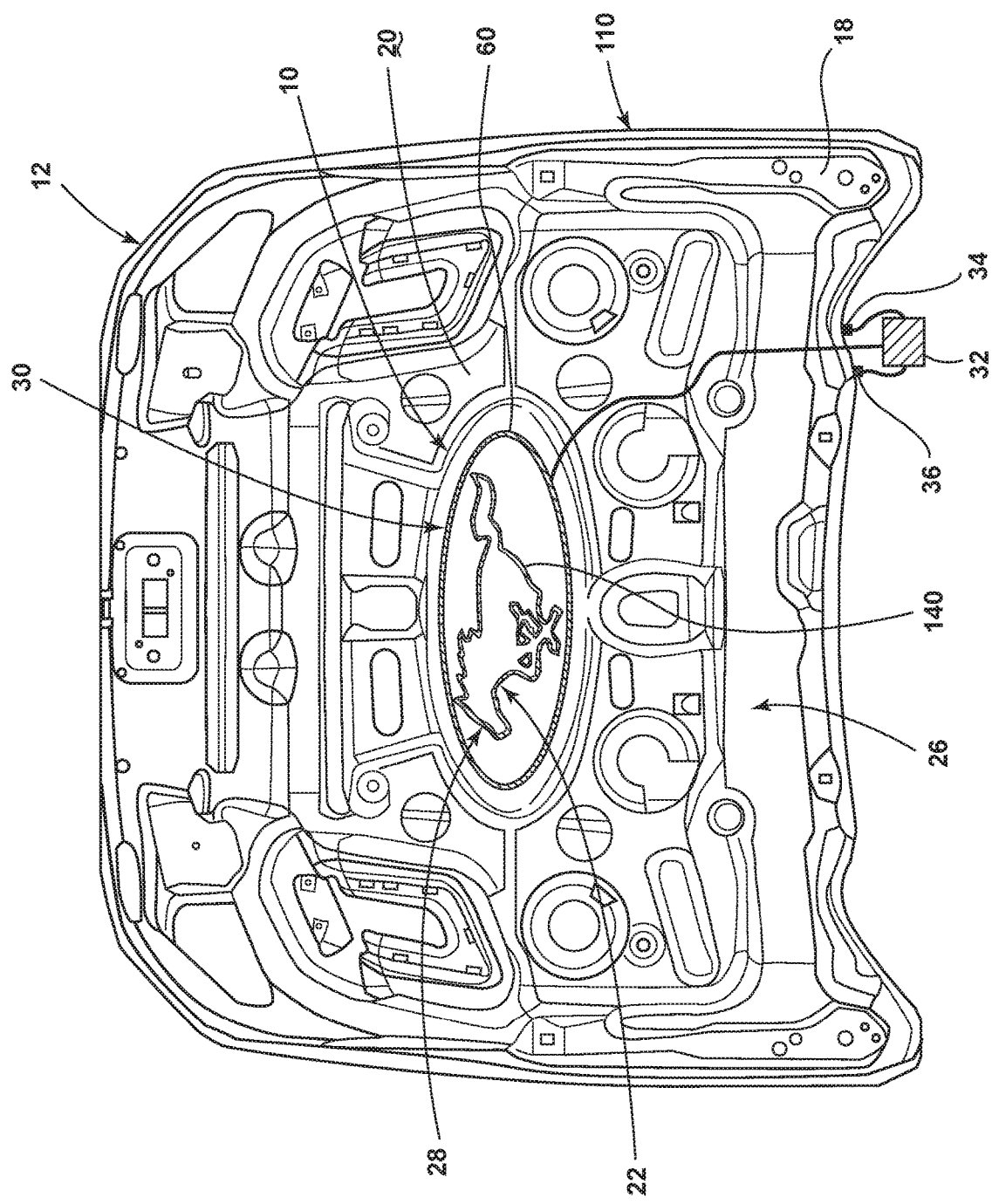
FIG. 3 is a bottom plan view of the body panel of FIG. 2, with the insulation layer and cover removed.
Figure 4:
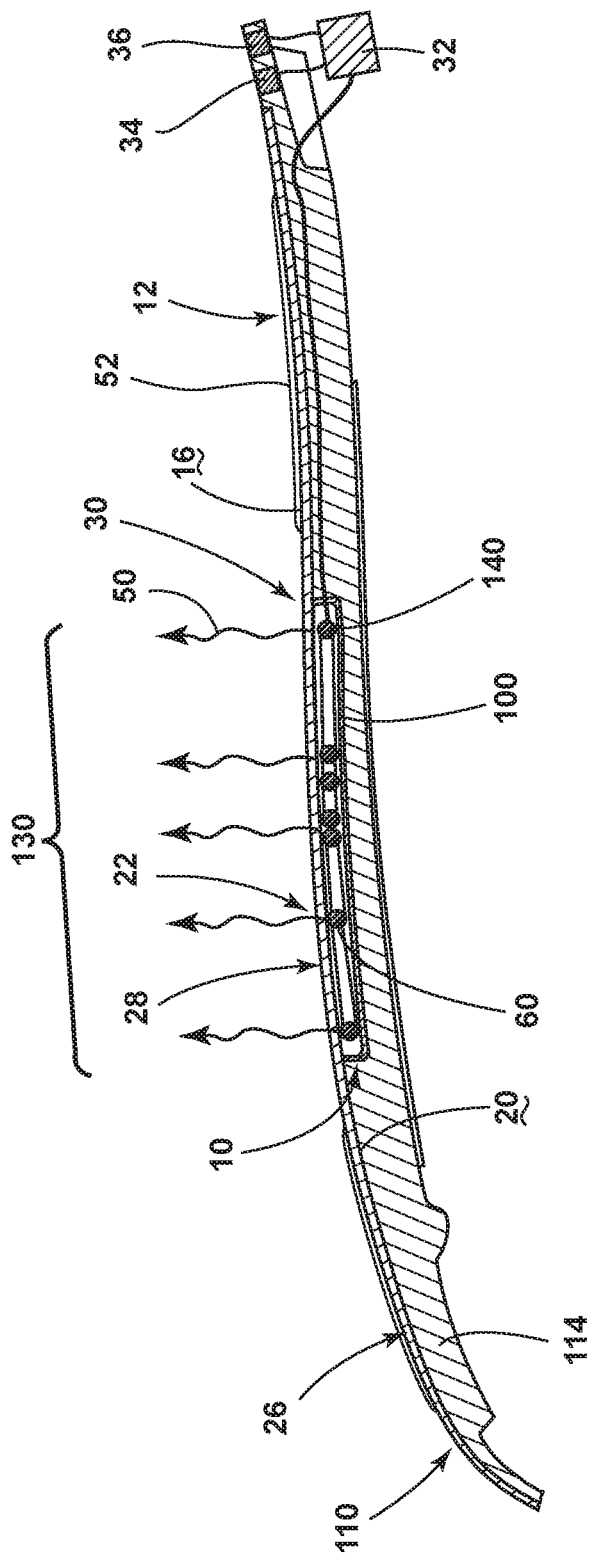
FIG. 4 is a cross-sectional view of the body panel of FIG. 2 taken along line IV-IV and illustrating the thermal structure for emitting heat to an outer surface of the body panel.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4 and 7, reference numeral 10 generally refers to a thermal structure disposed proximate a body panel 12 for a vehicle 14, where the thermal structure 10 is in thermal communication with an outer surface 16 of the body panel 12 of a vehicle 14, according to various embodiments. The vehicle 14 can include a body panel 12 that is coupled to a frame 18 for the vehicle 14, where the body panel 12 has an outer surface 16 and an inner surface 20. The thermal structure 10 is disposed proximate the inner surface 20 of the body panel 12. The thermal structure 10 can include at least one of a heat-emitting portion 22 and a heat-absorbing portion 24 (shown in FIGS. 5 and 6), wherein the thermal structure 10 is in communication with the outer surface 16 of the body panel 12. The placement of the thermal structure 10 defines an ambient temperature portion 26 and a differential temperature portion 28 of the outer surface 16 of the body panel 12. It is contemplated that the differential temperature portion 28 of the outer surface 16 of the body panel 12 is in communication with the thermal structure 10 and cooperates with the thermal structure 10 to generate a predetermined pattern 30. A controller 32 is in communication with the thermal structure 10 and includes at least one of a humidity sensor 34 and a temperature sensor 36 that are in communication with the ambient air 82 surrounding the body panel 12. The controller 32 operates the thermal structure 10 according to sensed data delivered to the controller 32 from at least one of the humidity and temperature sensors 34, 36. According to the various embodiments, it is contemplated that the thermal structure 10 can include either a heat-emitting portion 22 (exemplified in FIG. 4) or a heat-absorbing portion 24 (exemplified in FIG. 5), or can include both heat-emitting and heat-absorbing portions 22, 24 (exemplified in FIG. 6).

Referring again to FIGS. 1-4 and 7, the heat-emitting portion 22 of the thermal structure 10 is configured to deliver heat 50 to an outer surface 16 of the body panel 12. In this manner, where a fluid-based precipitation 52 is disposed on an outer surface 16 of the body panel 12, the heat-emitting portion 22 of the thermal structure 10 provides heat 50 to certain portions of the outer surface 16 of the body panel 12 and leaves other portions of the outer surface 16 of the body panel 12 at substantially the ambient temperature surrounding the vehicle 14. This temperature difference creates a temperature differential within the outer surface 16 of the body panel 12. This temperature differential is reflected through the shape of the differential temperature portion 28 of the outer surface 16 of the body panel 12. According to the various embodiments, precipitation 52 disposed within the differential temperature portion 28 of the outer surface 16 of the body panel 12 is heated by heat 50 delivered from the heat-emitting portion 22 of the thermal structure 10. By heating this precipitation 52, this precipitation 52 disposed within the differential temperature portion 28 is also heated and is, in turn, melted, evaporated, or both. The type of precipitation 52 that can be effected by the thermal structure 10 can include, but is not limited to, snow, frost, ice, rain, dew, combinations thereof and other similar fluid-based precipitation 52. It is contemplated that any fluid disposed on the body panel 12 can be utilized by the thermal structure 10, such as water disposed thereon while washing the car, water, ice or snow splattered thereon, or other fluid-based sources.

According to the various embodiments, as illustrated in FIGS. 2-4 and 7, the heat-emitting portion 22 of the thermal structure 10 can include a resistive heating element 60 or a plurality of resistive heating elements 68. The resistive heating element 60 can be coupled with an electrical system (not shown) for the vehicle 14 that provides an electrical current through the resistive heating element 60 for generating heat 50 from the heat-emitting portion 22 of the thermal structure 10. The resistive heating element 60 of the heat-emitting portion 22 can be shaped according to predetermined indicia 62 that is intended to be conveyed to the differential temperature portion 28 of the outer surface 16 of the body panel 12. When the electrical current is provided through the resistive heating element 60, the heat 50 emitted therefrom is transferred through the body panel 12 and to the outer surface 16 of the body panel 12. Precipitation 52, or other fluid-based material, within the differential temperature portion 28 is then heated such that precipitation 52 disposed on the outer surface 16 of the body panel 12 is melted and/or evaporated from the outer surface 16 to reveal a shape that is substantially similar to the shape of the resistive heating element 60 of the heat-emitting portion 22 of the thermal structure 10. Conversely, the precipitation 52 contained within the ambient temperature portion 26 of the outer surface 16 of the hood 110 remains substantially unchanged, or changes at a slower rate, as the resistive heating element 60 of the heat-emitting portion 22 gives off heat 50 to the differential temperature portion 28 of the body panel 12. The resulting effect is that precipitation 52 disposed in the outer surface 16 of the body panel 12 is altered at a faster rate, to reveal a predetermined indicia 62 imprinted through the heat-altering effects of the resistive heating element 60 on the precipitation 52 disposed thereon.

Figure 5:
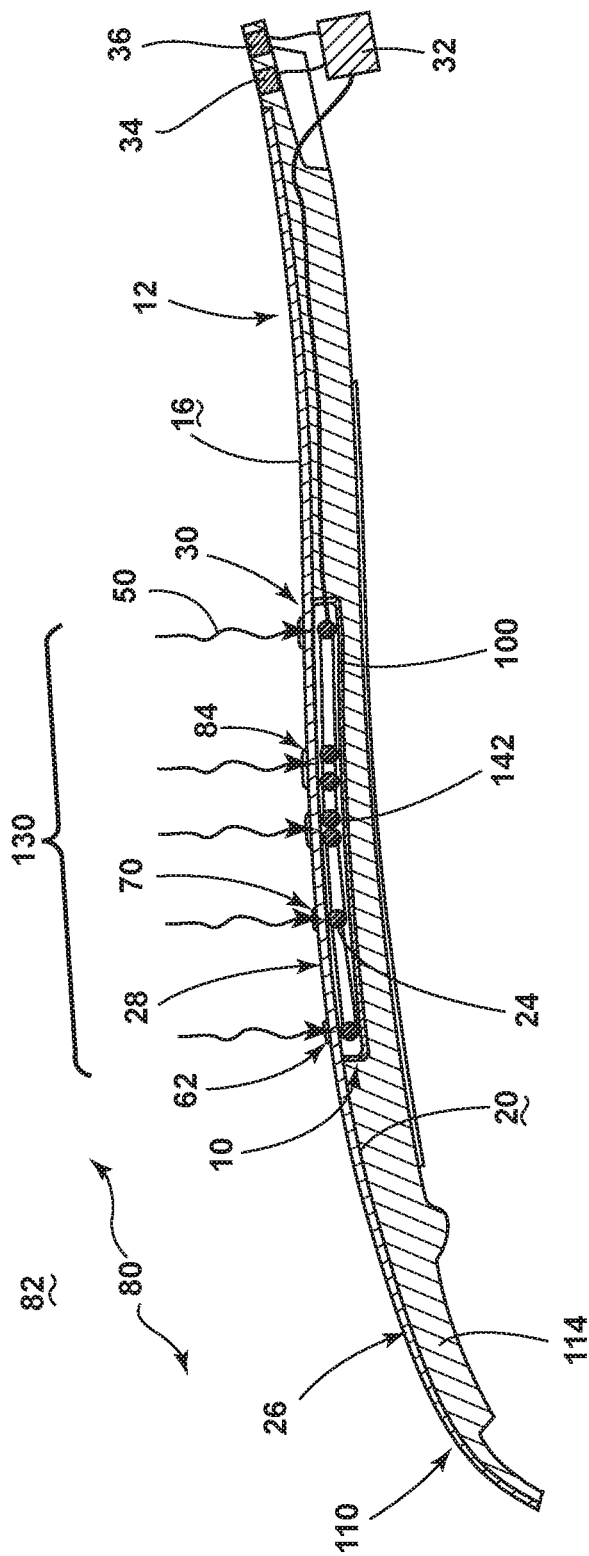
FIG. 5 is a cross-sectional view of an alternate embodiment of the body panel of FIG. 4 illustrating a thermal structure for absorbing heat from an outer surface of the body panel.

Referring now to the embodiment illustrated in FIG. 5, according to the various embodiments, it is contemplated that the thermal structure 10 can include a heat-absorbing portion 24, such as a cooling line, cooling plate, or other cooling portion, that is disposed in communication with a cooling system (not shown) of the vehicle 14. Such a cooling system can include the radiator, a heating ventilation and air conditioning (HVAC) system (i.e., air conditioner) or other self-contained cooling system that can be dedicated for use in conjunction with the thermal structure 10. According to the various embodiments, the heat-absorbing portion 24 of the thermal structure 10 can include a coolant line or a chilled wire that is disposed proximate the body panel 12 for cooling the differential temperature portion 28 of the outer surface 16 of the body panel 12 by absorbing heat 50 from the differential temperature portion 28. Where the heat-absorbing portion 24 is implemented, the differential temperature portion 28 can define a cooled portion 70 of the body panel 12 where heat 50 has been absorbed from. In this manner, where the heat-absorbing portion 24 of the thermal structure 10 is implemented, the differential temperature portion 28 of the outer surface 16 of the body panel 12 can be made cooler than the ambient temperature portion 26 of the body panel 12. Where the differential temperature portion 28 of the outer surface 16 of the body panel 12 defines the cooled portion 70, the cooled portion 70 can be configured in a shape that corresponds to the predetermined indicia 62 defined by the shape of the heat-absorbing portion 24 of the thermal structure 10.

According to the various embodiments, as exemplified in FIG. 5, the heat-absorbing portion 24 of the thermal structure 10 can utilize moisture 80, such as humidity, in the ambient air 82 to generate condensation 84 on the outer surface 16 of the body panel 12 in the shape corresponding to the predetermined indicia 62. In this manner, the thermal structure 10 having the heat-absorbing portion 24 can be utilized in situations where there may be no precipitation 52 present upon the outer surface 16 of the body panel 12. Accordingly, where only a heat-emitting portion 22 is implemented within the thermal structure 10, the user may need to wait for weather conditions that may result in precipitation 52 being disposed upon the outer surface 16 of the body panel 12. Conversely, where the heat-absorbing portion 24 of the thermal structure 10 is implemented, the coolant line, which can be an evaporator-type structure or a cooled wire disposed in the shape of predetermined indicia 62, can cool the differential temperature portion 28 of the outer surface 16 of the hood 110. This cooling, caused by the absorption of heat 50, can cause humidity within the air 82 to condense and precipitate upon the differential temperature portion 28 of the body panel 12. Accordingly, on a clear day that may have a certain level of humidity, the heat-absorbing portion 24 of the thermal structure 10 can be implemented to draw heat 50 from the body panel 12 to form the predetermined indicia 62 onto the differential temperature portion 28 of the outer surface 16 of the hood 110 through condensation 84 of the moisture 80 within the ambient air 82 around the outer surface 16 of the body panel 12.

According to various embodiments, where the weather is such that the temperature around the body panel 12 incorporating the thermal structure 10 is near the freezing point of water, the heat-absorbing portion 24 of the thermal structure 10 can be used to create the predetermined indicia 62 as a frost pattern or ice pattern upon the outer surface 16 of the body panel 12 within the differential temperature portion 28.

Figure 6:
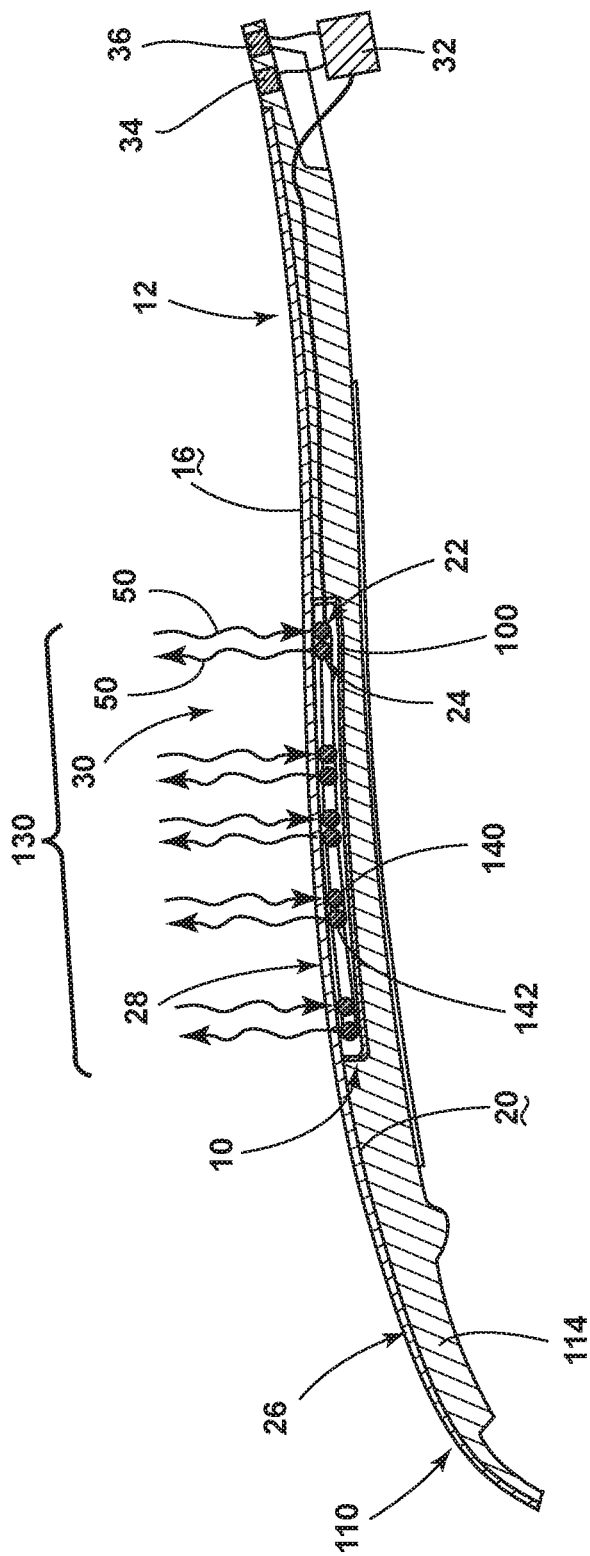
FIG. 6 is a cross-sectional view of an alternate embodiment of the body panel of FIG. 4 illustrating a thermal structure for emitting and/or absorbing heat from an outer surface of the body panel.

Referring now to FIG. 6, according to the various embodiments as discussed above, it is contemplated that the thermal structure 10 can include both a heat-emitting portion 22 and a heat-absorbing portion 24 within the thermal structure. The controller 32 in communication with the thermal structure 10 can include the humidity and temperature sensors 34, 36 that are disposed proximate the outer surface 16 of the particular body panel 12 that incorporates the thermal structure. The humidity and temperature sensors 34, 36 can be used to communicate data about the ambient humidity and temperature of the ambient air 82 surrounding the body panel 12 to the controller 32 such that the controller 32 can automatically operate the thermal structure 10 to create the predetermined indicia 62 within the differential temperature portion 28 of the outer surface 16 of the body panel 12, based upon current weather conditions.

Figure 7:
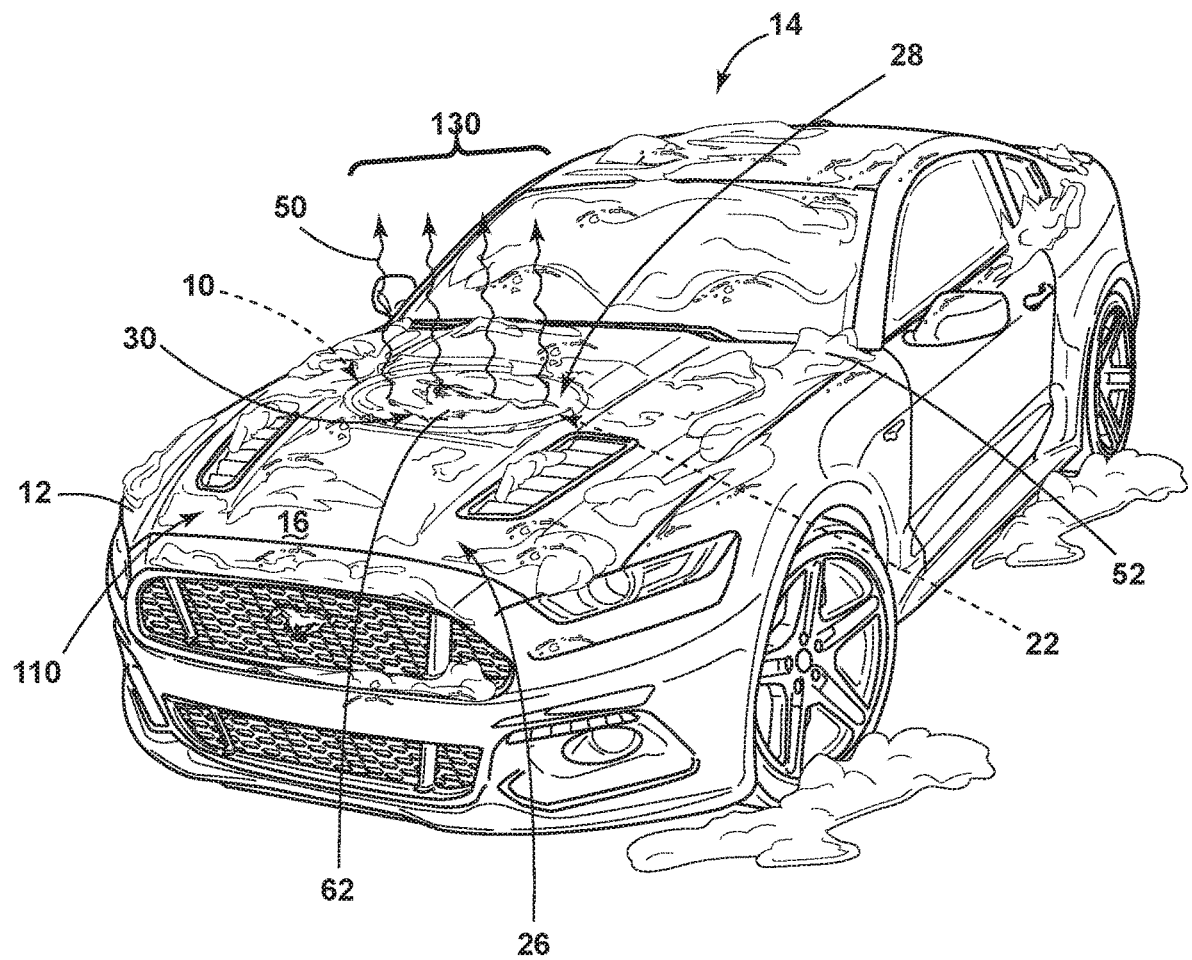
FIG. 7 is a top perspective view of the vehicle of FIG. 1 illustrating the effects of the thermal structure transferring heat to the outer surface of the body panel.

By way of example, and not limitation, where precipitation 52 in the form of snow or frost is disposed upon the body panel 12, the temperature sensor 36 may indicate a temperature below the freezing point of water and the humidity sensor 34 may indicate a low humidity level. This data communicated to the controller 32 can result in the controller 32 turning on the heat-emitting portion 22 of the thermal structure 10 such that the snow or frost disposed upon the differential temperature portion 28 of the outer surface 16 of the body panel 12 can be heated and, in turn, melted. The melting of the snow within the differential temperature portion 28 of the outer surface 16 of the body panel 12 serves to reveal the predetermined indicia 62 as revealed through the absence of snow upon the body panel 12 (as shown in FIG. 7). A similar operation can be implemented where the temperature and humidity sensors 36, 34 indicate that dew is likely present upon the outer surface 16 of the body panel 12. Conversely, where the temperature and humidity sensors 36, 34 indicate that a certain level of moisture 80 is present within the ambient air 82 around the body panel 12 of the vehicle 14 on a warm or hot day, the data communicated to the controller 32 may result in a controller 32 activating the heat-absorbing portion 24 of the thermal structure. Accordingly, heat 50 is removed from the differential temperature portion 28 of the thermal structure 10 to cool the differential temperature portion 28 and cause moisture 80 within the ambient air 82 to condense and form condensation 84 upon the differential temperature portion 28 of the outer surface 16 of the body panel 12. It is further contemplated that the controller 32 can include a manual override such that the user of the vehicle 14 can manually activate the heat-emitting portion 22 and/or the heat-absorbing portion 24 of the thermal structure 10.

Referring again to FIGS. 3-6, it is contemplated that the thermal structure 10 can be coupled with the frame 18 of the vehicle 14 to substantially secure the thermal structure 10 relative to the body panel 12. It is also contemplated that the thermal structure 10 can be attached to or, in some embodiments, incorporated within the body panel 12. It is also contemplated that the thermal structure 10 can be disposed within a cover 100 that is disposed at least partially around the thermal structure 10. Where a cover 100 is implemented, it is contemplated that at least a portion of the cover 100 can be made of a thermally conductive material to allow the heat-absorbing and/or heat-emitting properties of the thermal structure 10 to be in communication with the outer surface 16 of the particular body panel 12 having the differential temperature portion 28. It is contemplated that the cover 100 can be used to at least partially protect the components of the thermal structure 10, the controller 32, the temperature and humidity sensors 36, 34, and other components of the thermal structure 10.

Referring again to FIGS. 1-7, according to various embodiments, the body panel 12 implementing the thermal structure 10 can be a hood 110 for the vehicle 14, where the hood 110 at least partially covers an engine compartment 112 for the vehicle 14. Where the thermal structure 10 is disposed proximate the hood 110, the hood 110 or other body panel 12 can include an insulation layer 114 that is disposed proximate the inner surface 20 of the body panel 12. In such an embodiment, it is contemplated that the thermal structure 10 can be disposed between the inner surface 20 of the body panel 12 and insulation layer 114. Accordingly, the thermal structure 10 is positioned so that the insulation layer 114 does not impede the heat-emitting and/or heat-absorbing portions 22, 24 of the thermal structure 10 from delivering heat 50 to or absorbing heat 50 from the outer surface 16 of the body panel 12. At the same time, the insulation layer 114 can serve to substantially prevent heat 50 or cooling from the inner portions of the vehicle 14, such as the engine compartment 112, the passenger compartment, or other portions of the vehicle 14, from escaping, or from infiltrating these portions of the vehicle 14, when undesired.

According to the various embodiments, the thermal structure 10 can be used to convey a predetermined pattern 30 within the differential temperature portion 28 of the outer surface 16 of the body panel 12. It is contemplated that the predetermined pattern 30 can include the predetermined indicia 62 as well as a predetermined temporal sequence 130, where the predetermined indicia 62 may be revealed, possibly in separate portions, over a period of time. This predetermined pattern 30 can also include a combination of heating from the heat-emitting portion 22 of the thermal structure 10 and cooling from the heat-absorbing portion 24 of the thermal structure 10 being activated and/or deactivated over time. In this manner, it is contemplated that a temporal sequence 130 could be activated such that snow may be melted by the heat-emitting portion 22 of the thermal structure 10 and the fluid resulting from the melted snow may be refrozen into frost or ice by the heat-absorbing portion 24 of the thermal structure 10. Accordingly, various effects utilizing precipitation 52 and moisture 80 in the ambient air 82 can be implemented through the thermal structure 10 and a sequenced activation and/or deactivation of the heat-emitting portion 22 and heat-absorbing portion 24 of the thermal structure 10.

According to the various embodiments, it is contemplated that the heat-emitting portion 22 of the thermal structure 10 can include one or more heat-emitting components 140 that can be activated uniformly or sequentially to convey various effects through the formation of the predetermined pattern 30. Similarly, the heat-absorbing portion 24 of the thermal structure 10 can also include one or more heat-absorbing components 142 that can be uniformly or sequentially operated to form the predetermined pattern 30 on the outer surface 16 of the body panel 12. These heat-absorbing components 142 and heat-emitting components 140 can be operated in conjunction with the controller 32 through data provided by the temperature and humidity sensors 36, 34 of the thermal structure 10.

Referring again to FIG. 1, in addition to the use of precipitation 52 and moisture 80 in the air 82 for forming the predetermined pattern 30, it is also contemplated that the body panel 12 can include a paint 160 having a thermochromatic material 162 disposed therein. Such a thermochromatic material 162 can be configured to change color depending upon the temperature of the material. Such a thermochromatic material 162 can be used in conjunction with a thermal structure 10 to change the color of the differential temperature portion 28 of the body panel 12 to convey the predetermined indicia 62 and/or the predetermined pattern 30 through the heating and cooling functions of the heat-emitting and heat-absorbing portions 22, 24 of the thermal structure 10. In this manner, the thermal structure 10 can be disposed in communication with the thermochromatic material 162 to implement the color-changing functionality of the body panel 12 incorporating the thermochromatic material 162.

According to the various embodiments, it is contemplated that the heat-emitting portion 22 having the one or more heat-emitting components 140 can be made of a resistive heating element 60, such as a wire or other similar resistive heating element 60. It is also contemplated that the one or more heat-emitting components 140 can be made of fluid tubes where heated liquid or heated vapor can be run through the tubes to generate heat 50 therein.

It is also contemplated that the heat-absorbing portion 24 having the one or more heat-absorbing components 142 can be made of a refrigerant/coolant line in the form of an evaporator or other cooling structure used to absorb heat 50 from surrounding areas. The heat-absorbing components 142 can also be made from cooling wires, cooling plates, or other similar thermally conductive material that can be used to absorb heat 50 from a portion of the body panel 12. It is contemplated that the heat-absorbing components 142 can be coupled to the cooling system of the vehicle 14 that can incorporate a compressor, condenser, expansion device, a coolant, and other similar components that are generally incorporated within an air conditioning or cooling system for a vehicle 14. As discussed above, the heat-absorbing components 142 can also be coupled with the vehicle cooling system, such as the radiator, where cooling can be transferred from the cooling system to the heat-absorbing components 142 of the thermal structure 10.

Referring again to FIGS. 1-7, it is contemplated that the thermal structure 10 can be used in conjunction with various materials of the body panel 12 to accentuate the thermal effects of a thermal structure 10. In such an embodiment, it is contemplated that the differential temperature portions 28 of the body panel 12 can be made to include additional thermally conductive materials to better transfer the heat-emitting and/or heat-absorbing properties of a thermal structure 10 to the outer surface 16 of the body panel 12. It is also contemplated that thicker and thinner portions of insulation can be used to further define the differential temperature portion 28 of the body panel 12 from the ambient temperature portion 26 of the body panel 12 for use in conjunction with the thermal structure 10.

According to various embodiments, it is contemplated that instead of the thermal structure 10 directly defining the predetermined indicia 62 to be revealed on the outer surface 16 of the body panel 12, it is contemplated that the thermal structure 10 can be disposed on portions outside of the predetermined indicia 62 such that it is the ambient temperature portion 26 of the outer surface 16 of the body panel 12 that reveals the predetermined pattern 30 while the differential temperature portion 28 of the outer surface 16 of the body panel 12 effects the precipitation 52 and/or humidity within the air 82 to reveal the predetermined pattern 30 disposed within the ambient temperature portion 26 of the outer surface 16 of the body panel 12.

As illustrated in FIGS. 1 and 7, it is contemplated that the thermal structure 10 can be incorporated within various body panels 12 of the vehicle 14 that can include, but are not limited to, the hood 110, trunk lid 180, quarter panels 182, doors 184, roof 186, mirrors 188, bumpers 190, spoilers 192, fins and other similar body panels 12 of the vehicle 14.

According to various embodiments, it is contemplated that the engine of the vehicle 14 can act as the heat-emitting portion 22 or at least one or more of the heat-emitting components 140. In such an embodiment, the engine of the vehicle 14 can emit heat 50 through portions of the hood 110 or other body panels 12 proximate the engine. The various body panels 12 near the engine can be manufactured to include materials or structural variations that can allow varying degrees of heat 50 to be radiated through the differential temperature portion 28 at a different rate than that of the ambient temperature portion 26, thereby revealing the predetermined pattern 30. It is contemplated that the variations in the body panel 12 can be formed by the shape and/or structure of the body panel 12 or through variable thicknesses of the insulation layer 114. It is also contemplated that the heat 50 radiating from the engine can work in conjunction with the thermal structure 10 disclosed herein to reveal the predetermined pattern 30, wherein the engine can act as at least one of the heat-emitting components 140.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A temperature-controlled vehicle body comprising:
a thermal structure having a heat-absorbing structure; and
a body panel having an outer surface in communication with the heat-absorbing structure, wherein the heat-absorbing structure having a thermally conductive material, wherein the heat-absorbing structure draws heat away from the outer surface in a predetermined pattern and generates a temperature differential on the outer surface of the body panel, the temperature differential defining ambient and differential temperature portions of the outer surface of the body panel corresponding to the predetermined pattern, wherein,
the thermal structure also includes a heat-emitting structure formed into a shape corresponding to the predetermined pattern;
the heat-emitting structure includes a plurality of resistive heating elements that are in communication with a controller;
the controller operates the plurality of resistive heating elements according to the predetermined pattern, wherein the predetermined pattern includes a predetermined indicia; and
the plurality of resistive heating elements are activated according to a predetermined temporal sequence to generate the predetermined pattern.

2. The temperature-controlled vehicle body of claim 1, wherein the heat-absorbing structure is in communication with a coolant.

3. The temperature-controlled vehicle body of claim 1, wherein the heat-emitting structure and the heat-absorbing structure cooperate to generate the predetermined indicia and the predetermined temporal sequence of the predetermined pattern.

4. The temperature-controlled vehicle body of claim 2, wherein the body panel is a vehicle hood.

5. The temperature-controlled vehicle body of claim 1, wherein the controller uses data from at least one of a humidity sensor and a temperature sensor.

6. The temperature-controlled vehicle body of claim 1, wherein the body panel includes a paint having a thermochromatic material disposed therein, wherein the thermal structure is in communication with the thermochromatic material.

7. The temperature-controlled vehicle body of claim 1, wherein a cover is disposed at least partially around the thermal structure, and wherein the cover is made of a thermally conductive material.

* * * * *